(12) United States Patent
Gody et al.

(10) Patent No.: US 12,180,390 B2
(45) Date of Patent: *Dec. 31, 2024

(54) METAL SURFACE TREATMENT

(71) Applicant: SPECIALTY OPERATIONS FRANCE, Lyons (FR)

(72) Inventors: Guillaume Gody, Rueil-Malmaison (FR); Marie-Pierre Labeau, Sèvres (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 142 days.

This patent is subject to a terminal disclaimer.

(21) Appl. No.: 17/999,530

(22) PCT Filed: May 10, 2021

(86) PCT No.: PCT/EP2021/062296
§ 371 (c)(1),
(2) Date: Nov. 21, 2022

(87) PCT Pub. No.: WO2021/233714
PCT Pub. Date: Nov. 25, 2021

(65) Prior Publication Data
US 2023/0340306 A1    Oct. 26, 2023

(30) Foreign Application Priority Data
May 19, 2020    (EP) .................... 20305514

(51) Int. Cl.
*C09J 5/02*    (2006.01)
*C09J 133/10*    (2006.01)
*C09J 5/04*    (2006.01)

(52) U.S. Cl.
CPC .............. *C09J 133/10* (2013.01); *C09J 5/02* (2013.01); *C09J 5/04* (2013.01); *C09J 2301/312* (2020.08); *C09J 2301/414* (2020.08); *C09J 2400/163* (2013.01)

(58) Field of Classification Search
CPC ........................................................ C09J 5/02
See application file for complete search history.

(56) References Cited

U.S. PATENT DOCUMENTS

| 4,191,596 A | 3/1980 | Dollman et al. |
| 4,647,638 A | 3/1987 | Yokoshima et al. |
| 4,921,552 A | 5/1990 | Sander et al. |
| 9,732,255 B2 | 8/2017 | Curet |
| 2006/0011293 A1 | 1/2006 | Xia et al. |
| 2007/0095435 A1 | 5/2007 | Lammerschop et al. |

FOREIGN PATENT DOCUMENTS

| CN | 106589213 A | 4/2017 |
| CN | 107236440 A | 10/2017 |
| EP | 0322984 A2 | 7/1989 |
| EP | 3659715 A1 | 6/2020 |
| WO | 9713588 A1 | 4/1997 |
| WO | WO-2005/116294 A1 * | 12/2005 |
| WO | WO-2010/045657 A1 * | 4/2010 |

OTHER PUBLICATIONS

International Search Report issued in International Application No. PCT/EP2021/062296 dated Aug. 6, 2021 (4 pages).
Written Opinion issued in International Application No. PCT/EP2021/062296 dated Aug. 6, 2021 (6 pages).

* cited by examiner

*Primary Examiner* — Jeffry H Aftergut
(74) *Attorney, Agent, or Firm* — Osha Bergman Watanabe & Burton LLP

(57) ABSTRACT

The instant invention concerns the use of at least one polymer P obtained by radical copolymerization of a mixture of (i) acrylic acid; (ii) methacrylic acid; and (iii) at least one 2-hydroxyethyl methacrylate phosphate for treating a metallic surface intended to be adhesive-bonded to another surface, in order to impart a resistance to the adhesive failure to the resulting bonding.

15 Claims, No Drawings

METAL SURFACE TREATMENT

This application is a national stage entry under 35 U.S.C. § 371 of International Application No. PCT/EP2021/062296 filed May 10, 2021, which claims priority to European Application Nr. 20305514.0, filed on May 19, 2020. The entire contents of these applications are explicitly incorporated herein by this reference.

The instant invention relates to the field of the treatment of surfaces based on metal, and more specifically metal surfaces intended to be coated with adhesive compositions. The invention is more especially directed to a treatment of said metal surfaces aiming at providing an enhancement of the adherence of the adhesive composition on the metal surface.

In order to provide an enhancement of the adherence of film-forming organic compositions such as paints, varnishes or adhesives on metal surfaces, especially on aluminum or steel, several methods have been proposed, including i.a. the deposit of inorganic coatings on the surface of the metal, especially the so-called "conversion coating".

The term "conversion coating" is well known in the art and refers to a layer formed on the surface of a metal, that is an advantageous replacement of native oxide on said surface (especially on aluminum), and which is obtained by the controlled chemical formation of a film on the metallic surface by reaction with chemical elements of the metallic surface, so that at least some of the cations dissolved from the metallic material are deposited in the conversion coating.

Typically, coating such conversion coatings are obtained by reacting the metal surface with solutions containing metal cation and fluorides. In the past, chromium-containing coatings have been proposed (typically obtained by reaction of the surface with a solution including $H_2CrF_6$), and, more recently, less toxic coatings based e.g. on zirconium, titanium or other metals (for example obtained by reaction of the surface with a solution including $H_2TiF_6$, $H_2ZrF_6$, $H_2HfF_6$, $H_2AlF_6$, $H_2SiF_6$, $H_2GeF_6$, $H_2SNF_4$, or $HBF_4$). A conversion coating may include other compounds such as silane precursors for example.

For enhancing the adhesion on a coating such as conversion coatings it is known to add some additives, especially organic polymers. In this connection, it has been for example described the use of polyacrylic acids. A typical additive is ACUMER™ 1510 available from DOW (and previously from Rohm & Haas) that has been widely described for this kind of application. For more details in this connection, it may be especially be referred to WO97/13588, U.S. Pat. No. 4,191,596, or U.S. Pat. No. 4,921,552.

One aim of the present invention is to provide a new method for treating a metal surface, that imparts a good adherence of film-forming organic compositions of adhesive compositions applied to the metal surface.

To this end, the instant invention proposes to make use of a specific polymer, optionally (but not necessarily) together with (namely before, during, or after) the formation of a conversion coating, which leads to a treated metal surface that reveals very interesting: when coated by a film-forming composition such as a paint, varnish or adhesive composition, a good adherence is obtained between the surface and the coated composition. Besides, a good protection of the surface is obtained, especially against corrosion. When the metal surface is coated with an adhesive layer, the coated surface may typically be used for ensuring a so-called "adhesive bonding" between said coated metal surface and another surface (typically a similar metal surface treated with the same polymer) that is placed in contact with all or part of the adhesive coating. In this application, the specific polymer used according to the invention allows a resistance to the adhesive failure. In the scope of the invention, the inventors have now observed that the strength of the adherence between the adhesive and the metal surface reveals especially high, to such an extent that cohesive failure appears instead of (or at least more preferably than) adhesive failure when a sufficiently high mechanical stress is applied for separating the adhesive-bonded surfaces.

Adhesive failure is understood to mean that failure between two surfaces bonded by an adhesive occurs at the surface, the adhesive being retained on one surface.

Cohesive failure is understood to mean that failure between two surfaces bonded by an adhesive occurs within the adhesive, which is thus retained on both surfaces.

The improvement of the bonding between two surfaces treated by the polymer of the invention and then assembled by an adhesive is thus reflected by a resistance to the adhesive failure, which means that a cohesive failure will occur instead, in particular after ageing, compared to other existing treatments.

More precisely, the instant invention make use of at least one polymer P, which is a polymer obtained by radical copolymerization of a mixture of acrylic acid, methacrylic acid, and at least one 2-hydroxyethyl methacrylate phosphate of Formula (a) below:

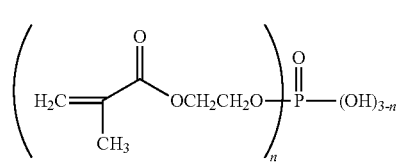

Formula (a)

wherein n is 1 or 2.

Typically, the polymer P is obtained by radical copolymerization of a mixture of acrylic acid, methacrylic acid, and a mixture of several 2-hydroxyethyl methacrylate phosphates of formula (a), with different values of n. Preferably, the polymer P is obtained by radical copolymerization of a mixture having the following molar ratio, based on the total quantity of acrylic acid, methacrylic acid and 2-hydroxyethyl methacrylate phosphates of formula (a):

acrylic acid (AA): from 65 to 90%, preferably from 80 to 90% (e.g., about 83-85%), methacrylic acid (MAA): from 5 to 30%, preferably from 5 to 15% (e.g., about 11-13%)

2-hydroxyethyl methacrylate phosphates: from 2 to 12%, for example from 2 to 10%, notably from 2 to 6% (e.g., about 4%).

The above molar ratios of each monomer in the polymer P are showing particularly good results in terms of resistance to the adhesive failure to the bonding when compared to polymers presenting no MAA or that are out of the above ranges of MAA. For example, when the quantity of MAA in the polymer P is too high then the polymer P is not soluble in the acidic treatment aqueous bath and cannot thus be used.

Besides, the polymer P used according to the invention preferably has a molecular weight, typically a weight average molecular weight, of at least 7,500 Da, e.g. 10 kDa to 1500 kDa, for example 10 kDa to 150 kDa, notably between 10 and 100 kDa. Typically, the polymer P used according to the invention has a molecular weight of from 10 to 40 kDa, e.g., 20 to 30 kDa.

A polymer P especially suitable for the invention is a random copolymer having a weight average molecular weight of about 20 to 30 kDa, that is the copolymerized product of a mixture of acrylic acid, methacrylic acid, and 2-hydroxyethy methacrylate phosphates of Formula (a), preferably in a molar ratio of about 85:11:4 or 83:13:4.

Average molecular weights (typically weight average molecular weight) are measured by Size Exclusion Chromatography (SEC). Notably the SEC is equipped with a MultiAngle Laser Light Scattering (MALLS) Mini Dawn TREOS detector and an Agilent concentration detector (RI detector). The SEC-MALLS system is running on three columns Varian Aquagel OH mixed H, 8 µm, 3*30 cm at a flow rate of 1 mL/min and with the following mobile phase: 85% water, 100 mM NaCl, 25 mM $NaH_2PO_4$, 25 Mm $Na_2HPO_4$-15% methanol. Polymer samples were diluted down to 0.5 active wt % in the mobile phase for at least 4 hours then filtrated in a Millipore filter 0.45 µm and 100 microliters were injected in the mobile phase flow. Absolute molar masses were obtained with the dn/dC of the poly (acrylic acid) equal to 0.1875 mL/g.

One specific object of the instant invention is the use of at least one polymer P as defined above for treating a first metallic surface (S1) intended to be bonded to a second surface (S2) by adhesive bonding and for imparting a resistance to the adhesive failure to the bonding. An additional advantage of the adhesive bonding obtained according to the invention is that it is highly resistant to corrosive atmospheres and to wet atmospheres, which lead to long lasting adhesive bonding. In most cases, the polymer is also used for obtaining this additional effect (namely for further imparting to the bonding a resistance to corrosive atmospheres and to wet atmospheres, in other words for obtaining both a very effective, but also long lasting adhesion). In other words, the use of at least one polymer P as defined above for treating a first metallic surface (S1) intended to be bonded to a second surface (S2) by adhesive bonding and for imparting a resistance to the adhesive failure to the bonding is also providing a very good resistance to ageing of the adhesive bonding. Such a property can be measured according to tensile tests on so-called "Single Lap Shear" (SLS) assemblies, such as defined in ASTM D-1002 10, performed on freshly bonded SLS assemblies and performed on SLS assemblies after ageing in corrosive atmospheres, wet atmospheres, or repeated cycles of corrosive atmospheres followed by wet atmospheres, such as ASTM G85 A3. Other tests simultaneously combine a corrosion stress and a mechanical stress (eg compression load), such as the By 101-07, known as Ford Durability Stress Test For Adhesive Lap-shear Bonds or Arizona Proven Ground Exposure (APGE). Notably an adhesive bonding with the polymer P according to the invention between two surfaces S1 and S2 has been demonstrated to provide failure facies, after ageing, that remain more cohesive.

Typically (but not necessarily), the second surface (S2) is also a metallic surface, having or not the same nature as the first surface (S1). According to an advantageous embodiment, the second surface (S2) is a metallic surface also treated with a polymer P of formula (a), generally but not necessarily identical to the polymer P of the first surface (S1).

More generally, the polymer P used according to the invention is preferably used for treating both surfaces (S1) and (S2) before the adhesive bonding of the two surfaces, especially when (S2) is a metallic surface.

The first metal surface (S1) is preferably a surface comprising a metal selected from aluminum, steel, zinc, magnesium, titanium, copper and their alloys, or cobalt-nickel alloys. The invention is especially interesting for metal surface of aluminum or aluminum alloys. The invention is especially interesting when the surface (S1) is a metal surface of aluminum or aluminum alloy.

The second surface (S2) may be metallic or non-metallic surface.

According to an interesting embodiment, the second surface (S2) is a surface comprising a metal, advantageously selected from aluminum, steel, zinc, magnesium titanium, copper and their alloys, or cobalt-nickel alloys. According to one embodiment, the nature of the surfaces (S1) and (S2) is the same, but they can also be distinct according to other possible embodiments of the invention. According to an interesting variant, both surfaces (S1) and (S2) are metal surface of aluminum or aluminum alloys.

According to another possible embodiment, the second surface (S2) is a non-metallic surface, for example a plastic surface e.g. based on polyamide, PEEK or ABS; or a composite surface based e.g on CFRP or Glass Fiber Reinforced Plastics.

Whatever the exact nature of surfaces (S1) and (S2), according to a possible embodiment, a conversion coating may be applied on the metallic surface (S1), by reaction of said surface with a conversion composition (in other words, a conversion composition is applied on the metallic surface for forming a conversion coating thereon). The use of a conversion coating is however not compulsory according to the invention, and, according to a specific embodiment, no conversion coating is applied on the surface (S1). When a conversion composition is used, typically:
  the conversion composition includes all or part of the polymer P as an additive; and/or
  the conversion coating is applied on the surface (S1) and then all or part of the polymer P is applied on the conversion coating.

The second surface (S2) may also receive a similar conversion coating, in the same conditions, especially when this second surface (S2) is a metallic surface. But again, the use of a conversion coating is not compulsory according to the invention, and, according to a specific embodiment, no conversion coating may be applied on the surface (S2).

According to another possible embodiment, compatible with the previous ones, all or part of the polymer P is contained in the adhesive composition applied onto the surfaces (S1) and (S2). According to this embodiment, the polymer may typically be introduced in the adhesive composition as a solid powder, said powder comprising the polymer alone or the polymer at the surface of a mineral filler (said powder may typically be obtained by spray drying a solution or suspension of the polymer, typically in presence of mineral filler). According to another aspect, one other specific object of the invention is a process for bonding a first metallic surface (S1) with a second surface (S2) (said surfaces being preferably as defined above), including:
  treating said first surface (S1) with at least one composition including at least one polymer P as defined above (said surface (S1) being preferably cleaned and/or activated before the treatment with the polymer P); and
  optionally treating the second surface (S2) with at least one composition including at least one polymer P as defined above (said surface (S2) being then preferably cleaned and/or activated before the treatment with the polymer P); and
  bonding the surfaces (S1) and (S2) via an adhesive composition applied between the two surfaces.

In that scope, the composition comprising the polymer P may typically be:
- a conversion composition including a polymer P; and/or
- a solution or a dispersion of the polymer P, preferably applied on the surface after having applied a conversion coating on the surface to be treated; and/or
- the adhesive composition, that may comprise all or part of the polymer P.

Typically, the polymer P is present in the conversion composition and/or in a solution or dispersion applied on a conversion coating. In that case, the adhesive is applied on a surface previously treated by the polymer.

According to some specific embodiments, an additional layer is applied between the treated surface (S1) and the adhesive (this is for example the case for the treatment of metal coil or part on a first site, that has then to be bonded on a second site: in that case, a lubricant may be applied on the treated coil or part, in order to protect it during transportation and storage and to facilitate downstream operations (coil cutting into sheets, blanking, stamping, forming, . . . ).

According to yet another aspect, a specific object of the instant invention are the materials comprising two adhesive-bonded surfaces including a first metal surface comprising a metal surface (S1) which is in all or part (i) treated with a polymer P as defined above and (ii) bonded to a second surface (S2) preferably as defined above via an adhesive.

These materials include i.a. materials that have a metal surface (S1) in all or part covered by:
- at least one coating (typically a conversion coating and/or a paint, a varnish or an adhesive layer) comprising at least one polymer P; and/or
- a layer (typically a conversion coating) comprising a reaction product of the polymer P as defined above with a metal of the treated surface or another compound present in said layer, or a polymer P strongly linked with said other compound (via a complexation, a ionic bonding or hydrogen bonding for example).

Specific features and possible embodiments will now be described in more details.

The Metal Surface (S1)

Any metal surface may be treated with a polymer P of the invention, but the invention is especially suitable for treating metal surfaces of:
- aluminum or an aluminum-based alloy; or
- steel, for example galvanized steel (hot dip galvanized HDG or electrogalvanized EG); or cold rolled steel (CRS); or
- magnesium or magnesium-based alloys; or
- Zinc or zinc-based alloys; or
- Titanium or titanium-based alloys.

The invention is especially interesting for metal surface of aluminum and aluminum alloys, such as Aluminum Alloy AA 5005 tested in the appended examples, or other alloys such as those of Series 1xxx, 2xxx, 3xxx, 4xxx, 5xxxx, 6xxx, 7xxx, such as AA1050, 2024, 3003, 5182, 5754, 6111, 6016, 6060, 6063, 6182, 7075.

The Optional Conversion Coating

When a conversion coating is applied on one or both of the surfaces (S1) and/or (S2), it may be obtained by contacting the surface with any conversion composition known from the prior art.

Contacting the metal surface with the conversion composition may be made by any means known per se, such as dip coating in a conversion bath or spray coating, as illustrative examples.

The conversion composition used according to the invention may typically contain fluorides anions and cationic metals, e.g. compounds such as $H_2CrF_6$, or more preferably chromium free compounds such as $H_2TiF_6$, $H_2ZrF_6$, $H_2HfF_6$, $H_2AlF_6$, $H_2SiF_6$, $H_2GeF_6$, $H_2SNF_4$, or $HBF_4$.

The conversion composition may also include other compounds, such as silane precursors for example, and/or cerium salts, and/or terbium molybdate.

In addition, according to a specific embodiment, the conversion composition may contain all or part of the polymer P used according to the invention for treating the surface. In that case, the application of the conversion layer leads per se to a surface treatment according to the invention.

Otherwise, the treatment is typically obtained after the formation of the conversion layer, by contacting the metal surface carrying the conversion layer with the polymers P (they may typically be applied on the conversion layer in the form of a solution or a suspension of polymers P, or within a paint, a varnish or an adhesive composition applied on the conversion layer).

According to a specific embodiment, it may be contemplated to make use of the polymer P both in the conversion composition and within the adhesive composition applied on the conversion layer.

Should the disclosure of any patents, patent applications, and publications which are incorporated herein by reference conflict with the description of the present application to the extent that it may render a term unclear, the present description shall take precedence.

The following examples illustrate the invention.

EXAMPLE

Example 1

A polymer according to the invention, obtained by a copolymerization of a mixture of acrylic acid, methacrylic acid, and 2-hydroxyethyl methacrylate phosphates of Formula (a), has been tested in this example. The process used to produce this polymer is based on conventional Free Radical polymerization, which is well known in the art.

This polymer (Polymer P1) presents the following characteristics:
- Weight average molecular weight Mw=24 000 g/mol, Number average molecular weight Mn=12 000 g/mol. Theses parameters were measured by Size Exclusion Chromatography (SEC) equipped with a MultiAngle Laser Light Scattering (MALLS) Mini Dawn TREOS detector and an Agilent concentration detector (RI detector). The SEC-MALLS is running on three columns Varian Aquagel OH mixed H, 8 μm, 3*30 cm at a flow rate of 1 mL/min and with the following mobile phase: 85% water, 100 mM NaCl, 25 mM $NaH_2PO_4$, 25 Mm $Na_2HPO_4$-15% methanol. Polymer samples were diluted down to 0.5 active wt % in the mobile phase for at least 4 hours then filtrated in a Millipore filter 0.45 μm and 100 microliters were injected in the mobile phase flow. Absolute molar masses were obtained with the dn/dC of the poly(acrylic acid) equal to 0.1875 mL/g.
- Molar ratio AA/MAA/2-hydroxyethyl methacrylate phosphates of Formula (a): 83/13/4

Performances were assessed through Single Lap Shear (SLS) tests, before and after ageing in corrosive conditions.

Coupons were prepared according to the protocol below and assembled to form SLS assemblies as described in D1002-10.

Step 1—20 coupons (aluminum alloy coupons: AA5754, from FBCG; 100 mm long, 25 mm wide, 3 mm thick) are cleaned and etched all together in one single step, combining cleaning and etching, in a 4 L bath at 50° C. contained in a stainless steel tank, typically made by diluting a commercially available formulation, DBT ALU 200, available from Chemtec Aertec (5 g of DBT ALU 200 into 995 g of water) for 3 mn under light stirring. The coupons were then rinsed twice during 1 mn with deionized water.

Step 2—the coupons are then pre-treated by dipping for 2 mn in the treatment bath, containing the polymer at 50° C. and at several concentration indicated in the Table 1 below. They are then rinsed altogether with a flow of deionized water for 1 mn and dried for 30 mn at 60° C.

Step 3—the coupons are then assembled in pairs, each pair forming a so called single lap shear "assembly": two coupons are placed horizontally, parallel, one above the other forming an overlap of 12.5 mm long and 25 mm wide ("overlap zone", including one of terminal zone of each of the two coupons of 25 mm wide, namely the last 12.5 mm of the 100 mm length of the coupon). A structural high T curing epoxy adhesive bead (Betamate 1496, from Dow) is applied with a gun under 7 bars on the overlap zone of the lower coupon. The upper coupon is then pressed, thus forming a bonding zone of 12.5 mm long, and 25 mm wide. Paper clips are used to maintain the assembly integrity before and during curing. The adhesive is then cured according to adhesive producer guidelines, typically for 40 mn at 180° C. Finally, paper clips are removed.

Step 4—tensile strength test I on assemblies as obtained in step 3

Used material: Zwick/Roell—Z50, with jaws grasping assembly tips over 50 mm and a pulling speed of 10 mm/mn (each jaw holds one of the bonded coupon of the pair, on a grasping zone of 50 mm of said coupon located at the end zone of each coupon opposite to the overlap zone. The jaws are then moved for pulling each of the coupon horizontally in the direction starting from the bonding zone towards the grasping zone)

Step 5—tensile strength test II performed on assemblies as obtained in step 3 after ageing 5.1. Ageing Cyclic Test A cyclic ageing test is performed according to ASTM G85— Annex 3 (SWAAT, 2011)

in a corrosion chamber Q-FOG CRH 600 L, from Q-FOG in the following conditions:

a 30-minute acidified salt fog spray followed by
    a 90-minute soak at >98% relative humidity under the following conditions:

Chamber temperature—constant 49° C.
    Air saturator temperature—constant 57° C.
    Relative humidity—>98%
    pH of fall out solution 2.8-3.0
    Volume of fall out solution—1.0-2.0 ml/80 cm$^2$/hour
    Exposure period—1000 hours After the exposure period is completed, the assemblies are washed down with luke-warm water to remove and neutralise excess acid and any remaining salt residues. All assemblies were then air dried using forced ambient temperature before being for submitted to lap-shear tensile testing.

5.2. Tensile Strength Test

In the conditions of the tensile strength test I of step 4

The obtained results are reported in Tables 2-5 below (the values are average values: the tests were performed on 3 assemblies before ageing and on 5 assemblies after ageing), with the following variations in step 2:

TABLE 1

| | conditions of step 2 | |
|---|---|---|
| Test no. | Concentration of polymer in the treating bath | pH |
| 1 | NONE (control) | |
| 2 | 1000 ppm | 2.13 |
| 3 | 1000 ppm | 8.97 |
| 4 | 5000 ppm | 2.56 |
| 5 | 5000 ppm | 6.15 |
| 6 | 5000 ppm | 8.39 |

Below are reported performances before ageing, after ageing, and the ratio between values after ageing and values before ageing, called "retention":

TABLE 2

| | Maximum STRAIN | | | | |
|---|---|---|---|---|---|
| | Before ageing (test I) | | After ageing (test II) | | |
| Test no. | maximum strain (MPa) | STD (MPa) | maximum strain (MPa) | STD (MPa) | Retention (%) |
| 1 (control) | 34.7 | 0.7 | 12.4 | 13.7 | 36 |
| 2 | 37.0 | 0.6 | 23.4 | 0.6 | 80 |
| 3 | 36.2 | 1.4 | 24.7 | 9.1 | 68 |
| 4 | 33.8 | 1.1 | 24.3 | 5.1 | 72 |
| 5 | 34.4 | 2.4 | 28.1 | 1.9 | 82 |
| 6 | 35.3 | 1.2 | 27.3 | 1.1 | 77 |

TABLE 3

| | Maximum LOAD | | | | |
|---|---|---|---|---|---|
| | Before ageing (test I) | | After ageing (test II) | | |
| Test no. | maximum load (N) | STD (N) | maximum load (N) | STD (N) | Retention (%) |
| 1 (control) | 10837.9 | 217.7 | 3862.4 | 4292.6 | 36 |
| 2 | 11558.0 | 179.9 | 9202.5 | 176.3 | 80 |
| 3 | 11306.5 | 434.4 | 7729.8 | 2837.3 | 68 |
| 4 | 10555.7 | 352.2 | 7597.1 | 1607.9 | 72 |
| 5 | 10761.5 | 764.6 | 8795.5 | 590.5 | 82 |
| 6 | 11043.1 | 385.5 | 8533.4 | 333.6 | 77 |

TABLE 4

| | Maximum ENERGY | | | | |
|---|---|---|---|---|---|
| | Before ageing (test I) | | After ageing (test II) | | |
| Test no. | maximum Energy (J) | STD (MPa) | maximum Energy (J) | STD (MPa) | Retention (%) |
| 1 (control) | 12 | 0.8 | 2.8 | 4.0 | 24 |
| 2 | 14.3 | 0.7 | 8.7 | 0.4 | 61 |

TABLE 4-continued

Maximum ENERGY

| | Maximum ENERGY | | | | |
|---|---|---|---|---|---|
| | Before ageing (test I) | | After ageing (test II) | | |
| Test no. | maximum Energy (J) | STD (MPa) | maximum Energy (J) | STD (MPa) | Retention (%) |
| 3 | 13.7 | 1.6 | 6.8 | 3.6 | 50 |
| 4 | 11.1 | 1.0 | 5.7 | 2.3 | 51 |
| 5 | 11.7 | 2.2 | 7.6 | 1.2 | 65 |
| 6 | 12.8 | 1.3 | 7.7 | 1.0 | 60 |

TABLE 6

FACIES after bond failure

| | FACIES after failure | |
|---|---|---|
| Test no. | Before ageing (test I) | After ageing (test II) |
| 1 (control) | c | a |
| 2 | c | ~c |
| 3 | c | ~c |
| 4 | c | ~c |
| 5 | c | ~c |
| 6 | c | ~c |

(c): cohesive fracture
(a): adhesive fracture
(~c): rather cohesive fracture

Example 2

Other polymers according to the invention, obtained by a copolymerization of a mixture of acrylic acid, methacrylic acid, and 2-hydroxyethyl methacrylate phosphates of Formula (a), have been tested in this example. The process used to produce polymers P2 and P3 is based on conventional Free Radical polymerization, which is well known in the art. The process used to produce P4 is based on controlled radical polymerization.

Those polymers present the following characteristics:
Polymer P2
Weight Average molecular weight Mw=22 000 g/mol, Mn=13 000 g/mol.
Molar ratio AA/MAA/2-hydroxyethyl methacrylate phosphates of Formula (a): 77/11/12
Polymer P3
Weight Average molecular weight Mw=68 000 g/mol, Mn=26 000 g/mol.
Molar ratio AA/MAA/2-hydroxyethyl methacrylate phosphates of Formula (a): 77/11/12
Polymer P4
Weight Average molecular weight Mw=19 000 g/mol, Mn=10 000 g/mol.
Molar ratio AA/MAA/2-hydroxyethyl methacrylate phosphates of Formula (a): 79/12/9

COMPARATIVE EXAMPLES

Comparative Polymer C0:
A polymer was prepared according to the same process as described for example 1 but with the following molar ratios: AA/MAA/2-hydroxyethyl methacrylate phosphate of formula (a) molar ratios=26/70/4

This polymer was not soluble in the acidic treatment bath and thus could not be tested.

Comparative Polymer C1: AA 100
A polyacrylic acid (100% AA) was prepared has been tested.
This polymer has a Mw=26 000 g/mol and a Mn=19 000 g/mol (same method of measure as described previously).

Comparative Polymers C2, C3:
Two comparative polymers were prepared with benzotriazole ethyl methacrylate instead of hydroxyethyl methacrylate phosphates. Details are given below:
General Formula:

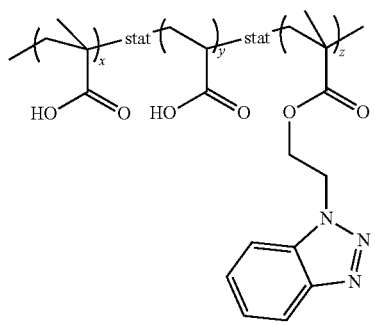

Comparative Polymer C2: 4 Mol % of Benzotriazole Ethyl Methacrylate (BztMA)
MAA/AA/BztMA=76/20/4 mol %
Mw=30 000 g/mol, Mn=15 000 g/mol (same method of measure as described previously).

Comparative Polymer C3: 10 Mol % of Benzotriazole Ethyl Methacrylate (BztMA)
MAA/AA/BztMA=67/23/10 mol %
Mw=30 000 g/mol, Mn=15 000 g/mol (same method of measure as described previously).

Performance Tests

Performances were assessed through Single Lap Shear (SLS) tests, before and after ageing in corrosive conditions. Coupons were prepared according to the protocol described for example 1 and assembled to form SLS assemblies as described in D1002-10.

Two waves of tests have been done.

Wave 1 Conditions:
Step 1: the bath is prepared with Chemtec DBT ALU 200 at 5% and heated to at 50° C. Coupons are immersed in it for 3 mn, and are then rinsed for 1 mn in hot water and then de-ionized water.
Step 2: the bath is heated to 50° C.; the pH is adjusted with sulfuric acid; coupons are immersed for 2 mn and are then rinsed for 1 mn with de-ionized water.

Wave 2 Conditions:
Step 1: the bath is prepared with Chemtec DBT ALU 200 at 5% and heated to at 50° C. Coupons are immersed in it for 1 mn, and are then rinsed for 1 mn in hot water and then de-ionized water.
Step 2: the bath is heated to 50° C.; the pH is adjusted with sulfuric acid; coupons are immersed for 2 mn and are then rinsed for 1 mn with de-ionized water.

Results
Wave 1

TABLE 7 conditions of step 2—Wave 1

| Test n° | Polymer | Details | Polymer concentration in the treatment bath | Treatment bath pH | Comment |
|---|---|---|---|---|---|
| 1.1 | None | NONE (control) | NONE (control) | — | Control |
| 1.2 | P1 | AA/MAA/formula a: 83/12/4 Mw 24 000 g/mol—Mn 12 000 g/mol | 50 ppm | 2.36 | |
| 1.3 | P1 | AA/MAA/formula a: 83/12/4 Mw 24 000 g/mol—Mn 12 000 g/mol | 200 ppm | 2.26 | |
| 1.4 | P1 | AA/MAA/formula a: 83/12/4 Mw 24 000 g/mol—Mn 12 000 g/mol | 500 ppm | 2.32 | |
| 1.5 | P1 | AA/MAA/formula a: 83/12/4 Mw 24 000 g/mol—Mn 12 000 g/mol | 1000 ppm | 2.38 | |
| 1.6 | P2 | AA/MAA/formula a: 77/11/12 Mw 22 000 g/mol—Mn 13 000 g/mol | 1000 ppm | 5.06 | |
| 1.7 | P2 | AA/MAA/formula a: 77/11/12 Mw 22 000 g/mol—Mn 13 000 g/mol | 1000 ppm | 2.35 | |
| 1.8 | P3 | AA/MAA/formula a: 77/11/12 Mw 68 000 g/mol—Mn 26 000 g/mol | 1000 ppm | 4.91 | |
| 1.9 | P3 | AA/MAA/formula a: 77/11/12 Mw 68 000 g/mol—Mn 26 000 g/mol | 1000 ppm | 2.35 | |
| 1.10 | C0 | AA/MAA/formula a: 29/70/4 | Not soluble | 2.35 | Not tested |
| 1.11 | C2 | MAA/AA/BztMA: 76/20/4 Mw 30 000 g/mol—Mn 26 000 g/mol | 200 ppm | 2.34 | |
| 1.12 | C2 | MAA/AA/BztMA: 76/20/4 Mw 30 000 g/mol—Mn 26 000 g/mol | 1000 ppm | 2.36 | |
| 1.13 | C3 | MAA/AA/BztMA: 67/23/10 Mw 30 000 g/mol—Mn 26 000 g/mol | 200 ppm | 2.32 | |
| 1.14 | C3 | MAA/AA/BztMA: 67/23/10 Mw 30 000 g/mol—Mn 26 000 g/mol | 1000 ppm | 2.40 | |

TABLE 8

STRAIN at maximum Load—Wave 1

| | STRAIN at Maximum Load | | | | |
|---|---|---|---|---|---|
| | Before ageing (test I) | | After ageing (test II) | | |
| Test no. | Av. strain (MPa) | STD (MPa) | Av. strain (MPa) | STD (MPa) | Retention (%) |
| 1.1 | 28.2 | 1.4 | 21.9 | 1.5 | 78 |
| 1.2 | 29.8 | 0.9 | 25.8 | 0.7 | 87 |
| 1.3 | 30.6 | 0.7 | 25.8 | 0.7 | 84 |
| 1.4 | 29.3 | 0.9 | 25.8 | 0.3 | 88 |
| 1.5 | 29.1 | 0.5 | 25.1 | 0.9 | 86 |
| 1.6 | 29.3 | 0.6 | 25.2 | 1.6 | 86 |
| 1.7 | 29.5 | 0.8 | 26.4 | 0.8 | 89 |
| 1.8 | 29.5 | 1.2 | 25.3 | 1.2 | 86 |
| 1.9 | 29.8 | 1.7 | 26.2 | 0.6 | 88 |
| 1.11 | 29.6 | 0.5 | 25.7 | 0.5 | 87 |
| 1.12 | 28.7 | 0.4 | 22.4 | 1.7 | 78 |
| 1.13 | 27.7 | 0.8 | 22.9 | 1.0 | 83 |
| 1.14 | 27.7 | 0.2 | 17.8 | 0.4 | 64 |

TABLE 9

MAXIMUM LOAD—Wave 1

| | Maximum Load | | | | |
|---|---|---|---|---|---|
| | Before ageing (test I) | | After ageing (test II) | | |
| Test no. | Av. Max. Load (N) | STD (N) | Av. Max. Load (N) | STD (N) | Retention (%) |
| 1.1 | 9056 | 356 | 7410 | 663 | 82 |
| 1.2 | 9571 | 313 | 8304 | 96 | 87 |
| 1.3 | 9709 | 135 | 8032 | 233 | 83 |
| 1.4 | 9340 | 323 | 8178 | 101 | 88 |
| 1.5 | 9355 | 215 | 8042 | 159 | 86 |
| 1.6 | 9320 | 279 | 7841 | 399 | 84 |
| 1.7 | 9289 | 245 | 8406 | 181 | 90 |
| 1.8 | 9709 | 119 | 7940 | 332 | 82 |
| 1.9 | 9419 | 423 | 8206 | 137 | 87 |
| 1.11 | 9435 | 66 | 7948 | 177 | 84 |
| 1.12 | 9225 | 114 | 7154 | 422 | 78 |
| 1.13 | 8862 | 177 | 7260 | 306 | 82 |
| 1.14 | 8822 | 85 | 5513 | 85 | 62 |

TABLE 10

Energy at maximum Load —Wave 1

| | Energy at Maximum Load | | | | |
|---|---|---|---|---|---|
| | Before ageing (test I) | | After ageing (test II) | | |
| Test no. | Av. Energy at max load (J) | SD Energy (J) | Av. Energy at max load (J) | SD Energy (J) | Retention (%) |
| 1.1 | 13.8 | 3.9 | 6.0 | 1.1 | 44 |
| 1.2 | 18.6 | 2.4 | 7.4 | 0.4 | 40 |
| 1.3 | 19.5 | 2.2 | 6.9 | 1.0 | 36 |
| 1.4 | 16.6 | 2.5 | 7.8 | 0.4 | 47 |
| 1.5 | 16.8 | 1.8 | 7.6 | 0.7 | 45 |
| 1.6 | 15.5 | 1.3 | 6.5 | 0.7 | 42 |
| 1.7 | 16.4 | 1.9 | 9.0 | 1.2 | 55 |
| 1.8 | 20.0 | 0.5 | 7.0 | 1.2 | 35 |
| 1.9 | 16.2 | 3.1 | 7.9 | 0.6 | 49 |
| 1.11 | 16.6 | 0.7 | 6.8 | 0.3 | 41 |
| 1.12 | 15.5 | 2.1 | 5.1 | 0.9 | 33 |
| 1.13 | 12.9 | 2.2 | 5.6 | 0.5 | 43 |
| 1.14 | 12.4 | 0.3 | 2.2 | 0.3 | 18 |

TABLE 11

FACIES after bond failure—Wave 1

| | Facies after failure | |
|---|---|---|
| Test n° | Before ageing (test I) | After ageing (test II) |
| 1.1 | c | a |
| 1.2 | c | ~c |
| 1.3 | c | ~c |
| 1.4 | c | ~c |
| 1.5 | c | ~c |
| 1.6 | c | ~c |
| 1.7 | c | ~c |
| 1.8 | c | ~c |
| 1.9 | c | c/a |
| 1.11 | ~c | a |
| 1.12 | c/a | a |
| 1.13 | ~a | a |
| 1.14 | ~a | a | c: cohesive fracture;
~c: rather cohesive fracture;
c/a: fracture both cohesive and adhesive;
~a: rather adhesive fracture;
a: adhesive fracture

Wave 2

TABLE 12 conditions of step 2—Wave 2

| Test n° | Polymer | Details | Polymer concentration in the treatment bath | Treatment bath pH |
|---|---|---|---|---|
| 2.1 | None | Control | | |
| 2.2 | P1 | AA/MAA/formula a: 83/12/4 Mw 24 000 g/mol—Mn 12 000 g/mol | 50 ppm | 2.30 |
| 2.3 | P2 | AA/MAA/formula a: 77/11/12 Mw 22 000 g/mol—Mn 13 000 g/mol | 50 ppm | 2.35 |
| 2.4 | P2 | AA/MAA/formula a: 77/11/12 Mw 22 000 g/mol—Mn 13 000 g/mol | 1000 ppm | 2.35 |
| 2.5 | P4 | AA/MAA/formula (a): 79/12/9 Mw = 19 000 g/mol—Mn = 10 000 g/mol | 50 ppm | 2.35 |
| 2.6 | P4 | AA/MAA/formula (a): 79/12/9 Mw = 19 000 g/mol—Mn = 10 000 g/mol | 1000 ppm | 2.35 |
| 2.7 | C1 | AA: 100 Mw = 26 000 g/mol—Mn = 19 000 g/mol | 50 ppm | 2.29 |
| 2.8 | C1 | AA: 100 Mw = 26 000 g/mol—Mn = 19 000 g/mol | 1000 ppm | 2.29 |

TABLE 13

STRAIN at maximum Load—Wave 2

| | Strain at Maximum Load | | | | |
|---|---|---|---|---|---|
| | Before ageing (test I) | | After ageing (test II) | | |
| Test n° | Av. Strain (Mpa) | SD Strain (MPa) | Av. Strain (Mpa) | SD Strain (MPa) | Retention (%) |
| 2.1 | 30.3 | 0.3 | 18.9 | 11.1 | 62% |
| 2.2 | 30.3 | 2.5 | 26.7 | 0.5 | 88% |
| 2.3 | 31.2 | 0.5 | 27.7 | 0.7 | 89% |
| 2.4 | 30.9 | 0.4 | 27.4 | 0.5 | 88% |
| 2.5 | 29.4 | 0.8 | 26.3 | 0.3 | 90% |
| 2.6 | 29.1 | 0.6 | 26.1 | 0.4 | 90% |
| 2.7 | 31.4 | 0.4 | 27.2 | 0.5 | 87% |
| 2.8 | 31.0 | 0.3 | 26.2 | 0.3 | 84% |

TABLE 14

MAXIMUM LOAD—Wave 2

| | Maximum Load | | | | |
|---|---|---|---|---|---|
| | Before ageing (test I) | | After ageing (test II) | | |
| Test n° | Av. Max. Load (N) | SD Max. Load (N) | Av. Max. Load (N) | SD Max. Load (N) | Retention (%) |
| 2.1 | 9457 | 53 | 5974 | 3485 | 63% |
| 2.2 | 9589 | 550 | 8369 | 116 | 87% |
| 2.3 | 9833 | 16 | 8909 | 234 | 91% |
| 2.4 | 9709 | 200 | 8660 | 106 | 89% |
| 2.5 | 9510 | 34 | 8398 | 62 | 88% |
| 2.6 | 9241 | 217 | 8267 | 163 | 89% |
| 2.7 | 9676 | 157 | 8363 | 170 | 86% |
| 2.8 | 9843 | 135 | 8247 | 148 | 84% |

TABLE 15

ENERGY at maximum Load—Wave 2

| | Energy at Maximum Load | | | | |
|---|---|---|---|---|---|
| | Before ageing (test I) | | After ageing (test II) | | |
| Test n° | Av. Energy (J) | SD Energy (J) | Av. Energy (J) | SD Energy (J) | Retention (%) |
| 2.1 | 8.74 | 0.42 | 3.80 | 2.46 | 44% |
| 2.2 | 9.05 | 2.36 | 6.16 | 0.17 | 68% |
| 2.3 | 9.82 | 0.20 | 6.88 | 0.66 | 70% |
| 2.4 | 9.28 | 0.60 | 6.51 | 0.26 | 70% |
| 2.5 | 10.52 | 0.40 | 6.24 | 0.06 | 59% |

TABLE 15-continued

ENERGY at maximum Load—Wave 2

| | Energy at Maximum Load | | | | |
|---|---|---|---|---|---|
| | Before ageing (test I) | | After ageing (test II) | | |
| Test n° | Av. Energy (J) | SD Energy (J) | Av. Energy (J) | SD Energy (J) | Retention (%) |
| 2.6 | 10.47 | 2.19 | 6.76 | 0.50 | 65% |
| 2.7 | 10.48 | 1.10 | 6.27 | 0.44 | 60% |
| 2.8 | 11.04 | 0.71 | 6.15 | 0.46 | 56% |

TABLE 16

FACIES after bond failure—Wave 2

| Test n° | FACIES after failure | |
|---|---|---|
| | Before ageing (test I) | After ageing (test II) |
| 2.1 | c/a | a |
| 2.2 | c | ~c |
| 2.3 | ~c | ~c |
| 2.4 | ~c | ~c |
| 2.5 | c | ~c |
| 2.6 | c | ~c |
| 2.7 | c | c/a |
| 2.8 | c | c/a | c: cohesive fracture;
~c: rather cohesive fracture;
c/a: fracture both cohesive and adhesive;
~a: rather adhesive fracture;
a: adhesive fracture

The invention claimed is:

1. A method of treating a first metallic surface (S1) intended to be bonded to a second surface (S2) by adhesive bonding, and for imparting a resistance to the adhesive failure to the bonding, comprising treating a metallic surface (S1) with at least one polymer P obtained by radical copolymerization of a mixture of (i) acrylic acid; (ii) methacrylic acid; and (iii) at least one 2-hydroxyethyl methacrylate phosphate of Formula (a) below:

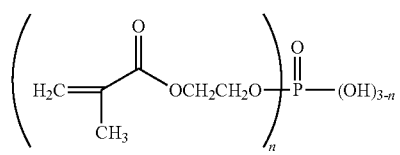

Formula (a)

wherein n is 1 or 2;
wherein the mixture has the following molar ratio, based on the total quantity of acrylic acid, methacrylic acid and 2-hydroxyethyl methacrylate phosphates of formula (a):
acrylic acid: from 65 to 90%,
methacrylic acid: 5 to 30%,
2-hydroxyethyl methacrylate phosphates: 2 to 12%; and
wherein the second surface (S2) is a metallic surface.

2. The method of claim 1, wherein the at least one polymer P imparts to the bonding a resistance to corrosive atmospheres and to wet atmospheres.

3. The method of claim 1, wherein the polymer P has a molecular weight of at least 7,500 Da.

4. The method of claim 1, wherein the metal surface (S1) is a surface comprising a metal selected from aluminum, steel, zinc, magnesium titanium, copper and their alloys, or cobalt-nickel alloys.

5. The method according to claim 3, wherein the metal surface (S1) is a surface of aluminum or aluminum alloy.

6. The method of claim 1, wherein the polymer P is used for treating both surfaces (S1) and (S2) before the adhesive bonding of the two surfaces.

7. The method of claim 1, wherein the polymer P is obtained by radical copolymerization of a mixture having the following molar ratio, based on the total quantity of acrylic acid, methacrylic acid and 2-hydroxyethyl methacrylate phosphates of formula (a):
acrylic acid: from 80 to 90%
methacrylic acid: 5 to 15%
2-hydroxyethyl methacrylate phosphates: 2 to 10%.

8. The method of claim 1, wherein the polymer P has a molecular weight of at least 10 kDa to 1500 kDa.

9. A process for bonding a first metallic surface (S1) with a second metallic surface (S2) including:
treating said first surface (S1) with at least one composition including at least one polymer P obtained by radical copolymerization of a mixture of (i) acrylic acid; (ii) methacrylic acid; and (iii) at least one 2-hydroxyethyl methacrylate phosphate of Formula (a) below:

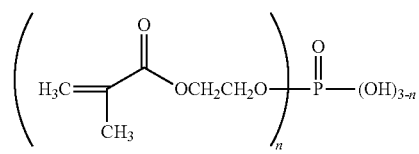

Formula (a)

wherein n is 1 or 2;
wherein the mixture has the following molar ratio, based on the total quantity of acrylic acid, methacrylic acid and 2-hydroxyethyl methacrylate phosphates of formula (a):
acrylic acid: from 65 to 90%,
methacrylic acid: 5 to 30%,
2-hydroxyethyl methacrylate phosphates: 2 to 12%; and
optionally treating the second metallic surface (S2) with at least one composition including the at least one polymer P; and
bonding the surfaces (S1) and (S2) via an adhesive composition applied between the two surfaces.

10. The process according to claim 9, wherein the composition comprising the polymer P is:
a conversion composition including the polymer P; and/or
a solution or a dispersion of the polymer P; and/or
the adhesive composition, that comprises the polymer P.

11. The process according to claim 10, wherein the solution or dispersion of the polymer P is applied on the surface after having applied a conversion coating on the surface to be treated.

12. The process according to claim 9, wherein the metallic surface (S1) is a surface comprising a metal selected from aluminum, steel, zinc, magnesium titanium, copper and their alloys, or cobalt-nickel alloys.

13. The process according to claim 9, wherein the metal surface (S1) is a surface of aluminum or aluminum alloy.

14. The process according to claim 9, wherein the polymer P is used for treating both surfaces (S1) and (S2) before the adhesive bonding of the two surfaces.

15. A material comprising two adhesive-bonded surfaces including a first metal surface comprising a metal surface (S1) which is in all or part (i) treated with a polymer P and (ii) bonded to a second metallic surface (S2), via an adhesive, said material being a material having a metal surface (S1) in all or part covered by:
- at least one coating comprising the at least one polymer P; and/or
- a layer comprising a reaction product of the polymer P with a metal of the treated surface or another compound present in said layer, or the polymer P strongly linked with said other compound,
- wherein polymer P is obtained by radical copolymerization of a mixture of (i) acrylic acid; (ii) methacrylic acid; and (iii) at least one 2-hydroxyethyl methacrylate phosphate of Formula (a) below:

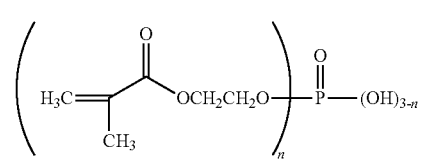

Formula (a)

wherein n is 1 or 2;

wherein the mixture has the following molar ratio, based on the total quantity of acrylic acid, methacrylic acid and 2-hydroxyethyl methacrylate phosphates of formula (a):

acrylic acid: from 65 to 90%, methacrylic acid: 5 to 30%, 2-hydroxyethyl methacrylate phosphates: 2 to 12%.

* * * * *